(12) United States Patent
Caretta

(10) Patent No.: US 6,479,008 B1
(45) Date of Patent: Nov. 12, 2002

(54) METHOD AND APPARATUS FOR MOULDING AND CURING TIRES FOR VEHICLE WHEELS

(75) Inventor: Renato Caretta, Gallarate (IT)

(73) Assignee: Pirelli Pneumatici S.p.A., Milan (IT)

(*) Notice: Subject to any disclaimer, the term of this patent is extended or adjusted under 35 U.S.C. 154(b) by 0 days.

(21) Appl. No.: 09/534,874

(22) Filed: Mar. 24, 2000

Related U.S. Application Data (60) Provisional application No. 60/134,057, filed on May 13, 1999.

(30) Foreign Application Priority Data

Mar. 26, 1999 (EP) .............................. 99830179

(51) Int. Cl.[7] .......................... B29D 30/06; B29C 35/00
(52) U.S. Cl. ......................... 264/501; 264/326; 425/36; 425/44; 425/49
(58) Field of Search ................................ 264/315, 326, 264/501; 425/35, 38, 43, 36, 44, 49

(56) References Cited

U.S. PATENT DOCUMENTS

| | | |
|---|---|---|
| 1,407,839 A | 2/1922 | Clinefelter et al. |
| 1,798,210 A * | 3/1931 | Laursen ...................... 264/326 |
| 3,674,899 A * | 7/1972 | Caretta et al. ............... 264/315 |
| 4,575,438 A * | 3/1986 | Fike et al. ................... 264/326 |

FOREIGN PATENT DOCUMENTS

| | | |
|---|---|---|
| FR | 1587458 | 3/1970 |
| GB | 12274 | of 1913 |

* cited by examiner

Primary Examiner—Mathieu D. Vargot
(74) Attorney, Agent, or Firm—Finnegan, Henderson, Farabow, Garrett & Dunner, LLP (57) ABSTRACT

A green tire manufactured on a toroidal support is closed in a vulcanization mould. Steam or another fluid under pressure is infed to a diffusion gap which is formed, following an expansion of the tire, between the inner surface of the latter and the outer surface of the toroidal support. Tire expansion is compensated for, by axially moving the beads away from the toroidal support, thereby eliminating too strong tensions on the cords forming the tire carcass structure. A pre-cured liner is previously applied to the inner surface of the tire, to prevent diffusion of water particles in the raw elastomer material.

30 Claims, 5 Drawing Sheets

METHOD AND APPARATUS FOR MOULDING AND CURING TIRES FOR VEHICLE WHEELS

This application claims the benefit of U.S. Provisional Application No. 60/134,057, filed May 13, 1999, and claims the right to priority based on European Application No. 99830179.0 filed Mar. 26, 1999, the content of both of which is incorporated herein by reference.

The present invention relates to a method of moulding and curing tires for vehicle wheels, comprising the following steps: disposing a tire on a toroidal support, the outer surface of which substantially mates an inner surface of the tire; closing the tire and the toroidal support inside a moulding cavity defined in a vulcanization mould, said moulding cavity having walls the shape of which match that of an outer surface of the tire when vulcanization has been completed; pressing the tire against the moulding cavity walls; and, transmitting heat to the tire to cause a molecular cross-linking of same.

The invention also relates to an apparatus for moulding and curing tires for vehicle wheels, comprising: a toroidal support arranged to engage a tire, said toroidal support having an outer surface substantially mating an inner surface of the tire; a vulcanization mould comprising at least two cheeks axially movable between an open condition in which they are mutually spaced apart to enable said toroidal support carrying a tire to be introduced thereinto, and a closed condition in which they are disposed in a mutual side-by-side relationship for enclosing the toroidal support and tire, within a moulding cavity confined by inner walls of the mould, the shape of which match an outer surface of the cured tire; pressing devices for pressing the outer surface of the tire against the inner walls of the mould; and, heating devices for transmitting heat to the tire enclosed between the moulding cavity and the toroidal support.

In a tire production cycle it is provided that, after a manufacturing process in which the different tire components are made and/or assembled, a moulding and curing process should be carried out for the purpose of stabilizing the tire structure to a given geometric configuration, characterized by a particular tread pattern.

To this aim, the tire is introduced into a vulcanization mould usually comprising a pair of cheeks adapted to be axially moved close to each other, which are arranged to operate on the tire bead and sidewalls, and at least one crown consisting of circumferentially distributed sectors susceptible of being radially moved close to each other so as to operate at the tire tread band. In more detail, cheeks and sectors are mutually movable between an open condition, in which they are spaced apart from each other for enabling loading of the tires being processed, and a closed condition in which they define a moulding cavity the geometric configuration of which is the same as the outer surfaces of the tire to be obtained.

In one of the most widespread moulding methods, it is provided that a vulcanization bladder of elastomer material filled with steam and/or another high-temperature and high-pressure fluid should be inflated at the inside of the tire enclosed in the moulding cavity. In this manner, the tire is conveniently pushed against the inner walls of the moulding cavity and stabilized to the geometric configuration imposed to it, following a molecular cross-linking to which the elastomer material, of which it is made, is subjected, due to heat transmitted by the fluid through the bladder and by the mould walls.

Also known are moulding methods in which, instead of an inflatable vulcanization bladder, a rigid toroidal support, having the same configuration as the inner surface of the tire to be obtained, is arranged within the tire.

Such a method is disclosed, for example, in the European Patent EP 242, 840, in which a rigid toroidal support is employed for imposing the shape and defining the tire enclosed in the mould. According to the above patent disclosure, the different coefficient of thermal expansion between the toroidal metal support and the raw elastomer material of which the tire is made is utilized for achieving an appropriate moulding pressure.

In conclusion, in such a prior art method, the assembly of the parts forming the mould and the toroidal support define a closed space in the moulding cavity which is exactly shaped as the whole geometric configuration of the tire. In this way, both the outer surfaces and the inner surfaces of the tire are maintained in contact with rigid portions of the moulding and curing apparatus. In other words, all parts of the apparatus that are intended for setting the final tire geometry are rigid parts, in contrast with the methods using an inflatable vulcanization bladder that, as known, constitutes a deformable portion of the mould.

It is the Applicant's feeling that, at the present state of the art, both methods using an inflatable vulcanization bladder and methods using a rigid toroidal support during the tire vulcanization have some problems.

With reference to the methods using an inflatable bladder, it is, in fact, to note that the bladder deformability can easily give rise to geometric and/or structural imperfections in the tire due to possible distortions suffered by the bladder, following an unbalanced expansion, for example, and/or due to friction phenomena generated between the outer surfaces of the bladder and the inner surfaces of the green tire.

Since the bladder also locks the tire beads against the corresponding mould portions, the bladder deformability makes it difficult to reach sufficiently high pressures for bead locking. Thus, undesired misalignments of the beads relative to the geometric axis of the tire may occur, giving then rise to distortions of the whole tire structure. In addition, an insufficient pressure for bead locking may cause formation of flashes at the beads, due to leakage of the elastomer material between the bladder and the mould, above all at the starting instants of the vulcanization process.

The vulcanization bladder needs use of significant amounts of steam, since the whole inner volume of the bladder inflated in the mould cavity is to be filled up. In addition, the bladder constitutes an obstacle to transmission of heat to the tire by the steam.

On the other hand, use of a rigid toroidal support instead of the inflatable vulcanization bladder makes it necessary to carry out a very precise and difficult checking of the volumes of the material employed in manufacturing the tire.

In addition, it is presently impossible to impose an appropriate radial and/or circumferential expansion to the tire, for achieving desired preloading effects in the reinforcing structures employed in the tire manufacture, for example.

Furthermore, even with the aid of the rigid toroidal support, achievement of a correct and efficient heat transmission to the inside of the tire is rather difficult.

U.S. Pat. No. 1,798,210 discloses a curing method according to which a previously-manufactured green tire is fitted on a toroidal support of vulcanized rubber, to be then closed in the moulding cavity defined in a vulcanization mould. The toroidal support is completely hollow and is such shaped and sized that it cooperates with the inner walls of the moulding cavity to carry out a hermetic seal at the inner circumferential edges of the tire. The toroidal support sizes however are lower than the inner sizes of the green tire, so as to define a gap extending from one bead to the other between the outer surfaces of the toroidal support and the inner surfaces of the green tire. After carrying out closure of the mould, hot water and/or another hot fluid under pressure is admitted to the toroidal support, which fluid reaches the above described gap through openings formed in the support for fulfilling all functions required for tire moulding and curing.

In this curing process, however, manufacturing of the tire directly an the toroidal support to be introduced into the vulcanization mould together with the tire is neither provided nor allowed.

In addition, since the toroidal support must necessarily be lower in size than the inner size of the tire, structural defects resulting from an imperfect centering and/or uncontrolled movements or distortions to which the tire is submitted on its being closed in the moulding cavity, may easily arise.

The Applicant has become aware of the fact that important improvements may be achieved if admission of working fluid, for carrying out tire moulding and/or heat supply for vulcanization, takes place at the inside of a gap which is formed between the toroidal support and the green tire only following an expansion imposed to the tire by application of pressure. A method and an apparatus conceived on the basis of this principle are the object of European Patent Application No. 98830473.9 in the name of the same Applicant.

In accordance with the present invention, it has also been found that important improvements may be achieved as regards tire expansion, with advantageous effects in terms of quality of the final product, if, concurrently with the expansion imposed to the tire, the inner circumferential edges of said tire are substantially disengaged from the toroidal support and allowed to move in a controlled manner relative to the latter.

In more detail, it is an object of the invention to provide a method of moulding and curing tires for vehicle wheels, characterized in that said pressing step takes place concurrently with an expansion imposed to the tire, preferably by admission of a fluid under pressure to at least one gap for fluid diffusion created between the outer surface of the toroidal support and the inner surface of the tire, an axial moving apart of the inner circumferential edges of the tire from the toroidal support being carried out concurrently with the tire expansion.

Preferably the axial moving apart of each inner circumferential edge of the tire from the toroidal support is carried out by axially moving backwardly at least one radially inner annular portion of a cheek being a part of said vulcanization mould and that contacts on the respective inner circumferential edge of the tire.

It is also preferably provided that concurrently with the tire expansion, side portions of the tire move to come into contact with fixed portions of the cheeks. This movement of the tire side portions preferably begins before the axial moving apart step of said inner circumferential edges. Advantageously, axial moving apart of the inner circumferential edges of the tire is carried out to an extent correlated with the expansion imposed to tire.

In accordance with a preferred embodiment of the invention, before said pressing step a tire preforming step is carried out by preliminary admission, between said outer surface of the toroidal support and the inner surface of the tire, of a working fluid to a pressure lower than that achieved during the pressing step.

The radial expansion resulting from the pressing step preferably involves an increase in the tire circumference between 1.5% and 3.5%, measured at the equatorial plane of the tire.

The diffusion gap during the pressing step preferably has a size between 3 mm and 14 mm measured between the inner surface of the tire and the outer surface of the toroidal support at the equatorial plane of the tire.

In a preferred embodiment, at least the preliminary admission of fluid under pressure for execution of the preforming step takes place through feed channels formed in the toroidal support and opening onto the outer surface thereof.

It is also preferably provided that during the preliminary admission of working fluid the tire should be sealingly engaged at its inner circumferential edges between the walls of the moulding cavity and the outer surface of the toroidal support, to hermetically delimit the diffusion gap at the inner circumferential edges of the tire.

Advantageously, heat supply preferably takes place by admission of a heating fluid to said diffusion gap. This heating fluid may constitute, or at least be part of, the same fluid under pressure employed for carrying out the pressing step.

It may be also conveniently provided that before admission of fluid under pressure the inner tire surface should adhere, substantially over the whole extension thereof, to the outer surface of the toroidal support, said diffusion gap being created following expansion of the tire.

Preferably, admission of fluid under pressure takes place to an upper portion of the moulding cavity communicating with a lower portion of the cavity through said diffusion gap.

Also preferably carried out concurrently with said admission step, is a step of drawing the fluid out of the lower portion of the moulding cavity, so as to create a pressurized fluid stream in the diffusion gap.

Conveniently, the step of disposing the tire on the toroidal support is accomplished by directly manufacturing the tire on the toroidal support.

In accordance with a further aspect of the invention, before the pressurized fluid admission, a treatment of the inner surface of the tire is carried out for preventing permeation of the fluid under pressure through the elastomer material forming the green tire. In more detail, a pre-cured liner is provided on the inner surface of the tire. Said pre-cured liner can be advantageously directly formed on the toroidal support during a preliminary step of the tire manufacture on the toroidal support.

In accordance with the invention, said method is put into practice by an apparatus for moulding and curing tires for vehicle wheels, characterized in that each of said cheeks comprises a radially outer annular portion and a radially inner annular portion acting at a respective inner circumferential edge of the tire and axially movable relative to said outer annular portion in a closed condition.

Preferably, said pressing devices are comprised of channels for feeding a fluid under pressure which are formed through the toroidal support and open onto the outer surface of the latter. In more detail, the radially inner annular portions of said cheeks are movable relative to said outer annular portions between a first position in which they cooperate with inner circumferential portions of the toroidal support to hermetically engage the tire in a sealing manner at respective inner circumferential edges thereof, and a second position in which they are spaced apart from the inner circumferential portions of the toroidal support.

Advantageously, the outer surface of the toroidal support and the inner walls of the mould in said moulding cavity delimit a holding space for the tire which, when the mould is closed, has a greater volume than the volume taken up by the tire.

It is also provided that the outer surface of the toroidal support should have a smaller diameter than the diameter of the inner surface of the cured tire.

The feed channels preferably open into at least one diffusion gap for the fluid under pressure which is defined between the outer surface of the toroidal support and the inner surface of the tire being processed.

Conveniently, the toroidal support has at least one centering shank to be engaged in a centering seating arrangement in the mould for centering the toroidal support and tire within the moulding cavity. This centering shank extends for example along a geometric axis common to said toroidal support, said tire being processed and said moulding cavity.

According to a further feature of the invention, the heating devices comprise at least one duct for sending a heating fluid to the feed channels. The heating fluid may consist of the same fluid under pressure admitted by the pressurized fluid feeding devices.

It may be also conveniently provided that the toroidal support should have an elastically yielding structure in an axial direction, at least at regions corresponding to inner circumferential edges of the tire.

Further features and advantages will become more apparent from the detailed description of a preferred non-exclusive embodiment of a method and an apparatus for moulding and curing tires for vehicle wheels, in accordance with the present invention. This description will be taken hereinafter with reference to the accompanying drawings, given by way of non-limiting example, in which.

With reference to the figures, a moulding and curing apparatus for vehicle wheel tires in accordance with the invention has been generally identified by reference numeral 1.

Apparatus 1 comprises a vulcanization mould 2 associated with a vulcanization press 3, only diagrammatically shown in that it can be made in any manner convenient for a person skilled in the art. For instance, mould 2 may consist of a lower half 2a and an upper half 2b in engagement with a bedplate 3a and a closing portion 3b of press 3, respectively.

In the example shown, each of the lower 2a and upper 2b halves of mould 2 has a lower cheek 4a and an upper cheek 4b respectively, and a lower 5a and upper 5b crown of sectors.

Figure 1:
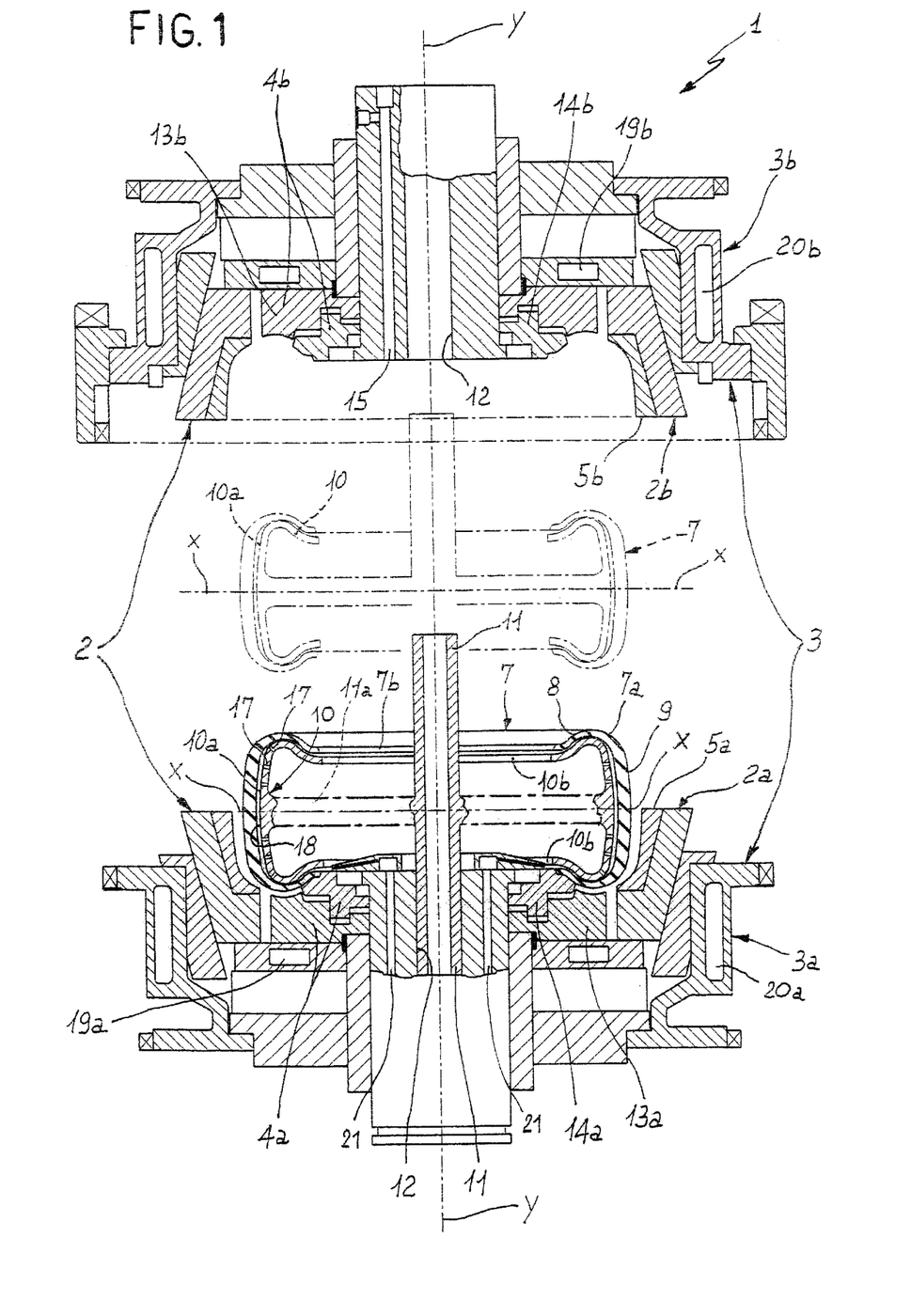
FIG. 1 diagrammatically shows an apparatus in accordance with the invention seen in cross-section, with a mould arranged in an open condition for enabling removal of a cured tire.
Figure 2:
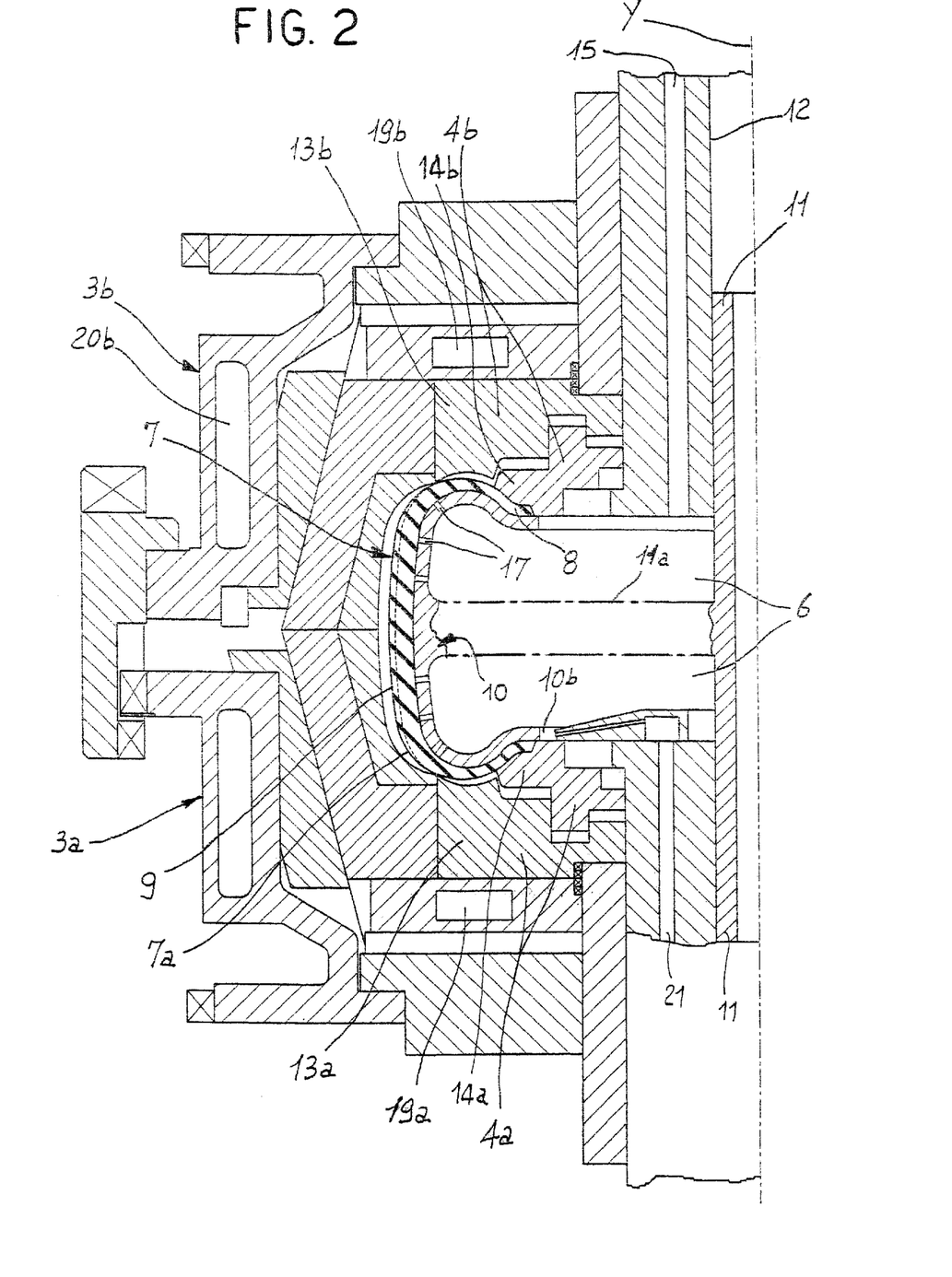
FIG. 2 is a fragmentary cross-half-section to an enlarged scale relative to FIG. 1, showing a green tire in a step coincident with, or immediately following, the mould closure.
Figure 3:
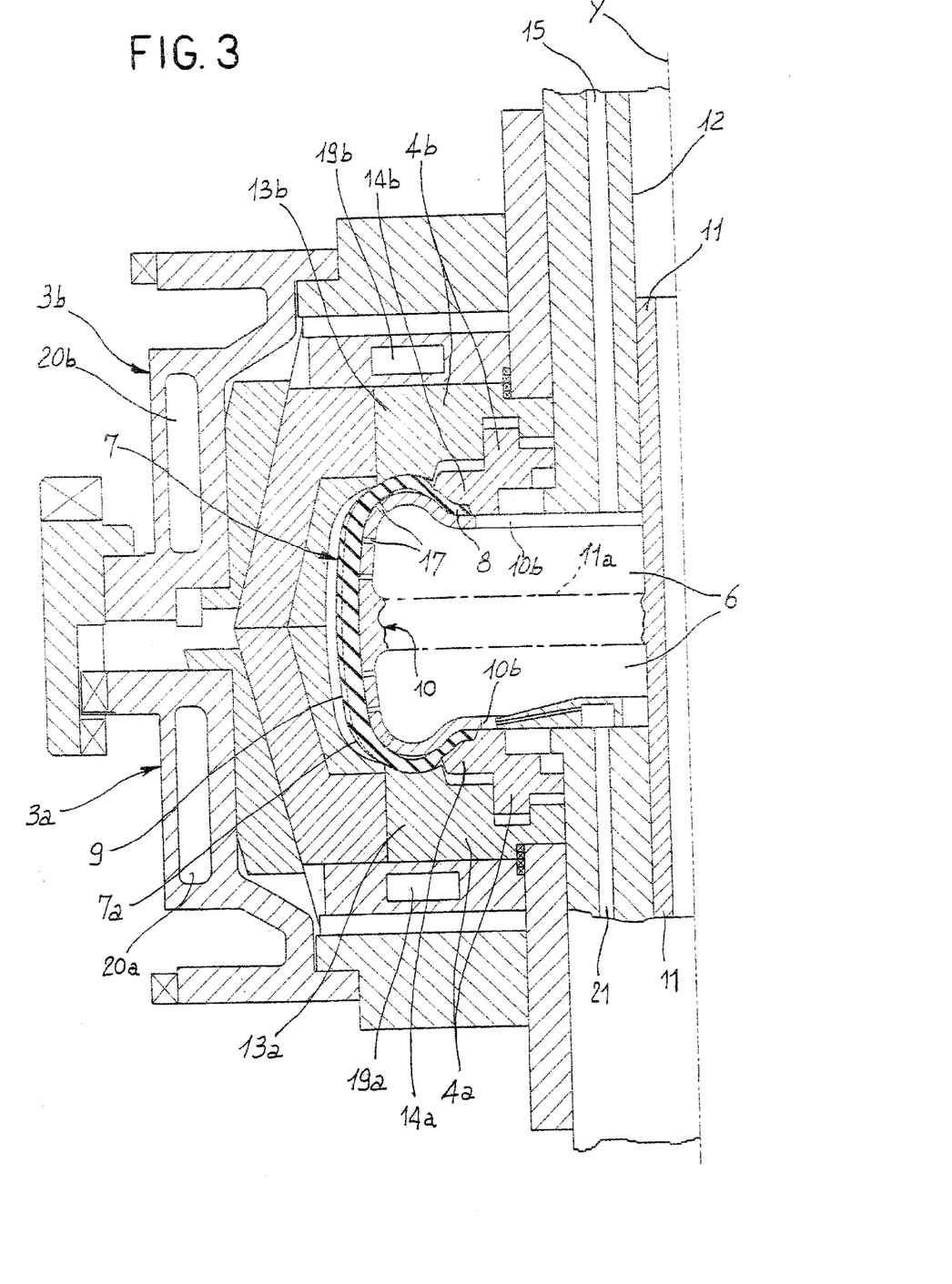
FIG. 3 is a cross-half-section of the tire during an operating step in which, following admission of working fluid under pressure to the moulding cavity, an initial separation is taking place between the inner surface of the tire and the outer surface of the toroidal support, as well as movement of the tire side portions towards the mould cheeks.

The lower 2a and upper 2b halves are mutually movable between an open condition in which they are mutually spaced apart as shown in FIG. 1, and a closed condition, shown in FIGS. 2 and 3, in which they are placed close to each other to form a moulding cavity 6 delimited by the inner walls of mould 2 defined by cheeks 4a, 4b and sectors 5a, 5b. The inner walls of mould 2 have a shape matching the geometric configuration of the outer surface 7a of a tire 7 to be obtained.

Tire 7 usually has a carcass structure, preferably of the radial type, formed of one or more carcass plies having the respective opposite end edges in engagement with annular reinforcing structures incorporated into the inner circumferential edges 7b of the tire, i.e., into the regions usually identified as "beads." Applied to the carcass structure, at a radially outer position thereof, is a belt structure comprising one or more belt layers disposed radially one upon the other in succession.

The carcass and belt structures, as well as the annular reinforcing structures at the beads have not been shown in the accompanying drawings in that they can be made in any convenient manner.

Cheeks 4a, 4b are intended for forming the outer surfaces of the opposite sidewalls 8 of tire 7, whereas sectors 5a, 5b are intended for forming the so-called tread band 9 of the tire, by creating a series of cuts and longitudinal and/or transverse grooves (not shown in the drawings) therein, suitably disposed so as to form the desired "tread pattern."

Apparatus 1 further involves use of at least one toroidal support 10 of metal material or another solid material, having an outer surface 10a reproducing or at all events substantially matching the shape of an inner surface of tire 7. The toroidal support 10 is conveniently made up of a collapsible drum, i.e., a drum made of centripetally movable circumferential segments so that the toroidal support can be disassembled and easily removed from tire 7 when the tire manufacture has been completed.

In accordance with the method of the invention, the green tire 7 is disposed on the toroidal support 10 before the latter is inserted, together with the tire, into the vulcanization mould 2 arranged in an open condition.

In particular, engagement of tire 7 on the toroidal support 10 can be conveniently obtained by manufacturing the tire directly on the support. In this way the toroidal support 10 is advantageously utilized as a rigid model for formation and/or deposition of the different components, such as the reinforcing structures at the beads, the belt layers, sidewalls and tread band, cooperating in forming the tire. Further details about the modalities of forming and/or laying down the tire 7 components on the toroidal support 10 can be found in the European Patent Application Nos. 97830633.0 and 97830731.2 for example, in the name of the same Applicant.

Under this circumstance, the geometric configuration of the inner surface of the green tire 7 will exactly correspond to, or at all events will substantially mate, the configuration of the outer surface of the toroidal support 10. In other words, the toroidal support 10 and tire 7 are in contact over the substantial entirety of their outer 10a and inner surfaces, respectively.

However, as better clarified in the following, the diameter of the outer surface 10a of the toroidal support 10 is preferably provided to be suitably lower than the diameter of the inner surface 7b of tire 7 when vulcanization has been completed.

The toroidal support 10 is preferably provided with at least one centering shank 12 for engagement in a centering seating 12 arrangement in mould 2, for establishing a precise positioning of the toroidal support and the tire 7 carried by it within the moulding cavity 6. In the embodiment shown, the toroidal support 10 has two centering shanks 11 extending at opposite sides along a geometric axis Y common to the toroidal support 10, the tire 7 and the moulding cavity 6, and arranged to be fitted into corresponding centering seatings 12 formed in the bedplate 3a and the closing portion 3b of the vulcanization press 3, respectively.

The centering shanks 11 can be connected to the toroidal support 10 by connecting linkages 11a (only diagrammatically shown) adapted to enable a centripetal movement of said circumferential segments forming the toroidal support.

Advantageously, each cheek 4a, 4b comprises a radially outer annular portion 13a, 13b rigidly in engagement with the bedplate 3a or the closing portion 3b of press 2 respectively, and a radially inner annular portion 14a, 14b, hereinafter referred to as a "bead ring", axially movable relative to the outer annular portion 13a, 13b.

In more detail, each bead ring 14a, 14b is movable, upon command of actuators not shown in that they can be made in any convenient manner, between a first position in which it is close to an equatorial plane X-X of the moulding cavity 6 and cooperates with the inner circumferential portion 10b of the toroidal support 10 to hermetically engage the inner circumferential edge 7b of tire in a sealing manner, and a second position in which it is moved apart from the equatorial plane X-X and the toroidal support 10.

Figure 4:
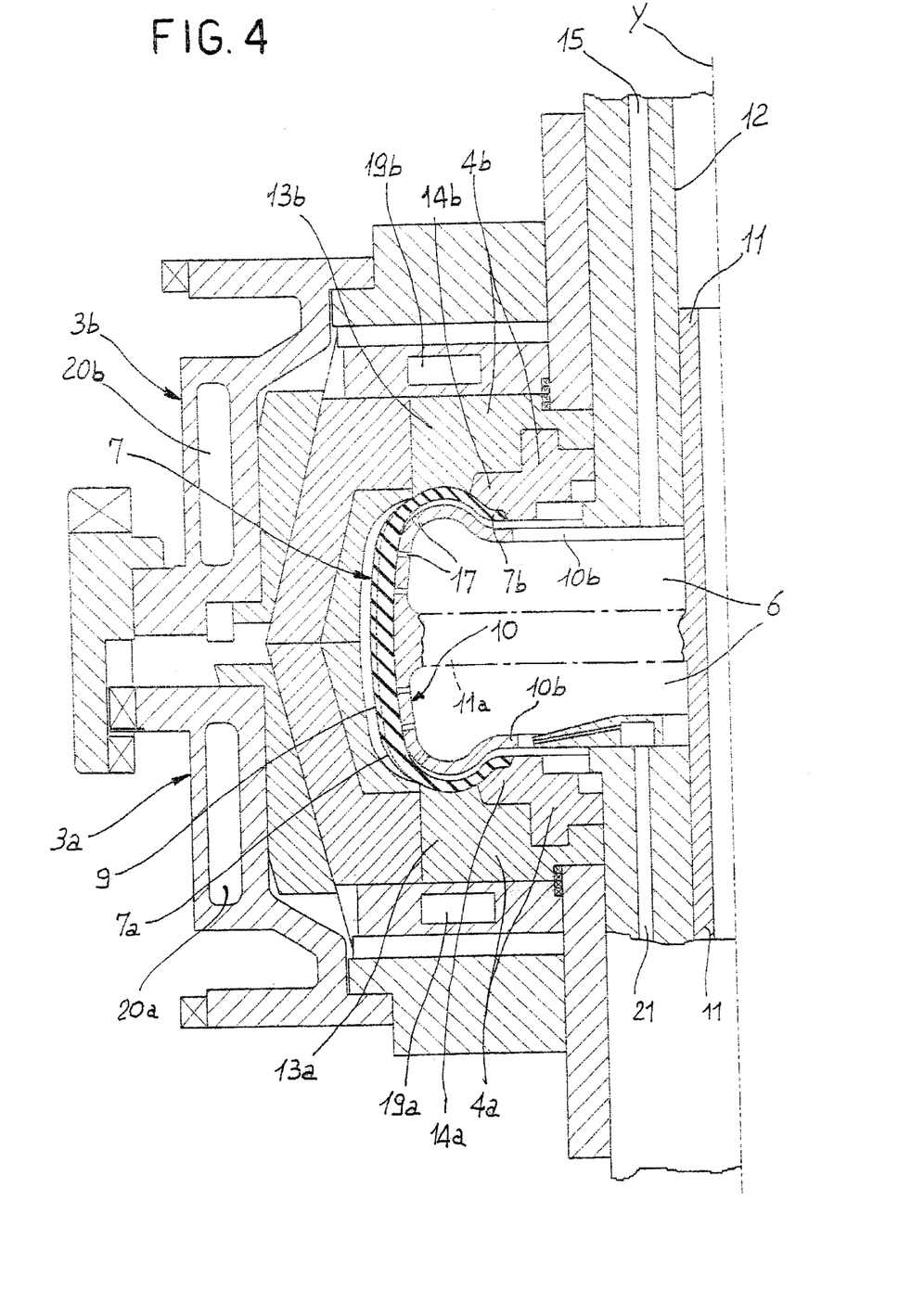
FIG. 4 is a cross-half-section of the apparatus during an operating step in which movement of the tire beads away from the toroidal support has occurred.
Figure 5:
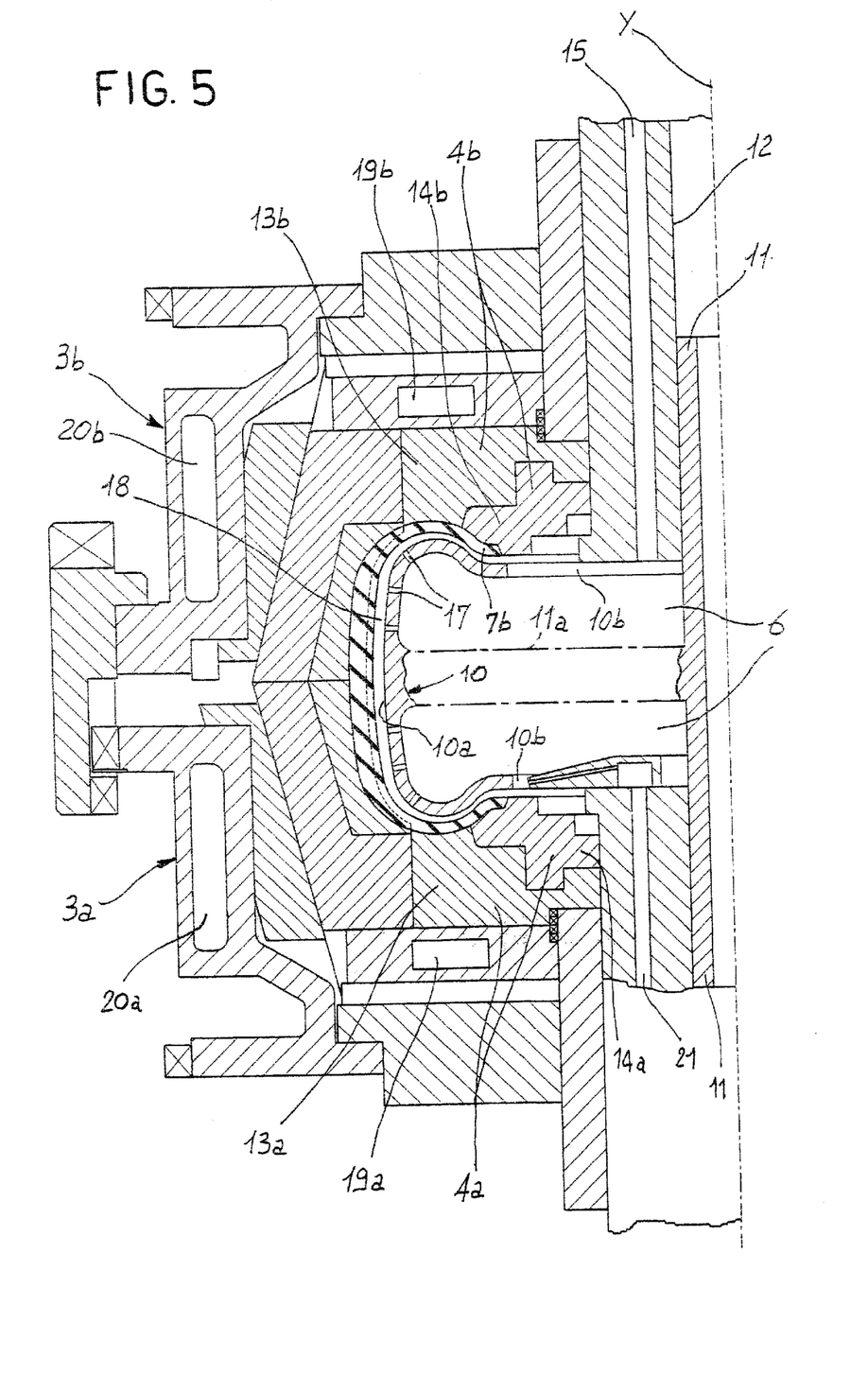
FIG. 5 is a cross-half-section of the tire being processed against the mould surfaces, following admission of steam under pressure to the moulding cavity.

As shown in FIGS. 4 and 5, in said second position the side of the bead ring 14a, 14b forming a portion of the moulding cavity 6 substantially extends in a surface continuity relationship relative to the corresponding side of the respective outer annular portion 13a, 13b.

When positioning of the toroidal support 10 with tire 7 on the lower portion 2a of the mould 2 has been carried out, the mould is brought to the closed condition.

On closure of the mould 2, or immediately after closure has been completed, each of the inner annular portions 14a, 14b of the lower 4a and upper 4b cheeks is disposed in the first work position. Consequently, each of the inner circumferential edges 7b of tire 7 is sealingly engaged between the inner circumferential portions 10b of the toroidal support 10 and the inner annular portions 14a, 14b of the lower 4a and upper 4b cheeks. In more detail, defined between the bead ring 14a, 14b of each cheek 4a, 4b and the corresponding inner circumferential portion 10b of the toroidal support 10, is a housing seating for an inner circumferential edge 7b of tire 7, usually known as a tire "bead".

Said bead seatings give the respective beads 7b a moulded shape of absolute geometric precision and thickness, in that said shape is determined by a direct coupling between the rigid surfaces of the toroidal support 10 and cheeks 4a, 4b of mould 2.

In addition, said bead seatings ensure a completely steady and precise centering of tire 2 relative to axis "Y" of the moulding cavity 6.

Preferably, the toroidal support 10 is also sized in such a manner that, at least at the regions corresponding to beads 7b of tire 7, it exhibits an elastically yielding structure in an axial direction, due to mutual moving close of cheeks 4a, 4b arranged with the respective inner annular portions 14a, 14b in the first operating position in the mould 2 closing step.

The axial deformation of the toroidal support 10 at the regions in contact with cheeks 4a, 4b close to the tire beads 7b is preferably between 0.3 and 0.5 mm, so as to generate a specific pressure between 18 and 25 bars on the surfaces in contact with the corresponding cheeks 4a, 4b. This contact pressure, during the initial moulding and curing steps of tire 7, prevents any elastomer material leakage between the surfaces in mutual contact of the toroidal support 10 and of cheeks 4a, 4b, thereby avoiding formation of consequent flashes.

Advantageously, the outer surface 10a of the toroidal support 10 and the inner walls of mould 2 delimit, in the moulding cavity 6, a space for holding tire 7 that, when the mould is closed, has a greater volume than the volume taken up by the tire. Therefore, as can be viewed from FIG. 2, at the moment that mould 2 is closed, the inner walls of the mould, at sectors 5a, 5b, and of the outer annular portions 13a, 13b of cheeks 4a, 4b, keep some distance from the outer surface of tire 7, whereas the inner surface of the tire adheres to the outer surface 10a of the toroidal support 10 substantially over the whole extension thereof.

During this step, the tread band 9 can be at all events partly penetrated by the raised portions arranged on sectors 5a, 5b to define said tread pattern.

When closure of mould 2 has been completed, tire 7 must be submitted to a pressing step, its outer surface 7a being pressed against the inner walls of mould 2, concurrently with heat supply, so as to effect a molecular cross-linking of the elastomer material forming the tire and the consequent geometric and structural stabilization of the latter.

For this purpose, apparatus 1 is provided with pressing devices comprising at least one primary duct 15 for feeding a fluid under pressure, formed in the closing portion 3b for example of press 3 and opening into the moulding cavity 6 so as to send a fluid under pressure into said cavity, at a radially inner position of the toroidal support 10.

Extending through the toroidal support 10 are a plurality of channels opening onto the outer surface 10a of the toroidal support and suitably distributed over the circumferential extension of same.

The fluid under pressure fed from the primary duct 13 to the moulding cavity 6 reaches therefore the outer surface 10a of the toroidal support 10 through the feed channels 17.

Due to pressure exerted by the fluid, tire 7—having its inner circumferential edges 7b sealingly engaged in the above described bead seatings—tends to expand within the holding space defined between the inner walls of mould 2 and the outer surface of the toroidal support 10. Thus a diffusion gap 18 filled with fluid under pressure is created between the inner surface of tire 7 and the outer surface of the toroidal support 10.

In more detail, it is preferably provided that the pressing step should be preceded by an initial preforming step, carried out by preliminary admission to the moulding cavity 6 of a working fluid consisting of nitrogen for example, fed at a pressure just as an example, between 3 and 5 bars and at all times lower than that reached during the pressing step.

The preforming step causes a separation of the inner surface of tire 7 from the toroidal support 10, and an expansion of the tire at the sidewalls 8, as viewed from FIG. 3. Thus, this expansion causes the side portions or sidewalls 8 of tire 7 to approach the fixed outer annular portions 13a, 13b of the upper 4a and lower 4b cheeks.

Through an axial backward movement, the inner annular portions 14a, 14b of the upper 4a and lower 4b cheeks are then brought to the second work position, as shown in FIG. 4. In this manner, concurrently with an expansion of tire 7, an axial moving away of the inner circumferential edges 7b of tire 7 from the toroidal support 10 is caused. The inner circumferential edges 7b keep a steady sealing engagement against the respective inner annular portions 13a, 13b due to the pressure exerted by the working fluid admitted to the moulding cavity 6. Concurrently with the movement of the inner circumferential edges 7b away from the toroidal support 10, a true pressing step of the tire against the inner surfaces of mould 2 is caused, simultaneously with a further expansion imposed to the tire and consequent increase in the diffusion gap 18 volume, until the whole outer surface 7a of the tire fully adheres to the inner walls of mould 2.

Preferably, admission of fluid under pressure for the purpose of carrying out the pressing step, as well as the preceding preforming step, is accomplished through the primary duct 15 in an upper portion of the moulding cavity 6. This upper portion of the moulding cavity 6 communicates with the lower portion of same through the diffusion gap 18, as well as through the spaces existing between the connecting linkages 11a of the toroidal support 10.

Simultaneously, the fluid under pressure is drawn out of the lower portion of the moulding cavity 6, through one or more discharge ducts 21 connected to the lower portion close to the inner circumferential edges 7b of tire 7. Thus a stream of fluid under pressure running from the upper portion to the lower portion of the moulding cavity 6 is advantageously created, thereby ensuring an efficient and homogeneous heat supply to tire 7.

In the pressing step, the diffusion gap 18 preferably has a size between 3 mm and 14 mm, measured between the inner surface 7b of tire 7 and the outer surface 10a of the toroidal support 10, at least close to an equatorial plane of the tire which is coincident with the equatorial plane X-X of the moulding cavity 6.

It is also preferably provided that the extent of the expansion imposed to tire 7 should involve a stretching of the belt structure thereof, with a circumference increase between 1.5% and 3.5% measured at the equatorial plane X-X of the tire.

Advantageously, this expansion does not involve any anomalous tensioning on the cords forming the tire carcass structure, even in the case in which said tire should have a carcass of the radial type. In fact, a full or at all events sufficient movement of the beads away from the toroidal support compensates for elongation that otherwise would be imposed to the carcass cords should the beads, during the tire expansion, be maintained-locked against the toroidal support 10. The pressurized fluid admitted to the diffusion gap 18 during pressing step can consist of nitrogen for example, or another inert gas.

However, in a preferred embodiment, it is provided that, in addition to or in place of the inert gas, steam should be employed, which must preferably be overheated to a temperature preferably between 170° C. and 210° C., fed with a gradually increasing pressure until a value included between 16 and 30 bars, preferably of about 18 bars, is reached. Under this circumstance, the pressurized fluid sent to the feed channels 17 for tire moulding also accomplishes the function, in part or in full, of the heating fluid, i.e., transmitting the necessary heat for tire vulcanization to the tire.

The primary duct 15, moulding cavity 6 and feed channels 17, together with further canalizations 19a, 19b, 20a, 20b adjacent to cheeks 4a, 4b and sectors 5a, 5b of mould 2, supplied with steam under pressure at high temperature, also perform the function of heating devices for the mould 2 walls to transmit to tire 7, also from the outside to the inside, the necessary heat for molecular cross-linking of the tire.

In accordance with a further aspect of the invention, before admission of fluid under pressure, a treatment is preferably carried out on the inner surface of tire 7 to prevent steam under pressure from permeating through the raw elastomer material of which the tire is made, above all during the initial steps of the vulcanization cycle. In more detail, arrangement of at least one pre-cured liner on the inner surface of the tire is provided for this purpose. Advantageously, the pre-cured liner (not shown in the figures) can be directly formed on the toroidal support 10 during a step preceding manufacturing of tire 7 on the toroidal support, or applied to the outer surface 10a of the toroidal support 10 in the form of a skim coat.

Further specifications on the composition and features of the liner are described in European Patent Application 98830696.5 in the name of the same Applicant, to which please refer for possible further explanations.

The invention achieves important advantages.

In fact, the possibility of manufacturing the tire directly on a rigid toroidal support ensures a high degree of geometric precision and structural uniformity in the finished tire.

Employment of a rigid toroidal support during the moulding and curing step enables a perfect centering of the tire within the vulcanization mould, and allows a greater control of the geometric and structural features of the tire during the expansion step as compared with traditional processes using inflatable vulcanization bladders. This geometric and structural control is also further improved by an efficient anchoring of beads 7b between cheeks 4a, 4b and the toroidal support 10, as previously described, without any risk of flash formation due to leakage of the elastomer material, not even during the initial steps of the moulding and curing process.

In addition, admission of steam under pressure and at a given temperature to the diffusion gap formed between the toroidal support and the inner surface of the tire ensures a greater transmission of heat to the tire, which transmission is not hindered by bodies of elastomer material such as the vulcanization bladders of the known art, and is more efficient than that obtainable by contact with solid bodies such as the toroidal support.

Use of a toroidal support during the vulcanization step further offers the possibility of greatly reducing the volume taken up by steam within the tire so that vulcanization is achieved with a greatly reduced amount of steam, as compared with the known art.

Admission of steam or another fluid under pressure between the toroidal support and the inner tire surface also enables appropriate pre-loading forces to be produced, through tire expansion, in the inner quality reinforcing structures of the tire, resulting in enhanced performance of the finished tire.

In particular, advantageously the invention makes it possible to cause a stretching with consequent pre-loading forces in the belt structure of the tire, without imposing too much tensioning to the cords forming the ply or plies belonging to the carcass structure, even when the tire has a carcass structure of the radial type with a very low profile, i.e. with a low value of the sectional height/width ratio (H/C≦0.65), and/or made of metallic cords or at all event of cords having a high modulus of elasticity.

Arrangement of a pre-cured elastomer layer on the inner surface of the tire also eliminates the risk that a direct contact of steam with the inner surfaces of the tire may cause diffusion of water within in the layers of raw blend, above all during the initial steps of the vulcanization process.

Obviously, many modifications and variations may be made to the invention as described. For instance, the diffusion gap 18 may be provided to be at least partly defined by a surface lowering arranged on the outer surface 10a of the toroidal support 10. In this case too, due to admission of fluid under pressure, an expansion of tire 7 increasing the volume of the diffusion gap 18 is achieved.

What is claimed is:

1. A method of moulding and curing tires for vehicle wheels, comprising the following steps:

disposing a tire on a toroidal support the outer surface of which substantially mates an inner surface of the tire;

closing the tire and the toroidal support inside a moulding cavity defined in a vulcanization mould, said moulding cavity having walls the shape of which match that of an outer surface of the tire when vulcanization has been completed;

pressing the outer surface of the tire against the moulding cavity walls;

transmitting heat to the tire to cause a molecular cross-linking;

wherein during said pressing step an expansion is imposed to the tire;

wherein the tire expansion is carried out by admitting a fluid under pressure to at least one gap for fluid diffusion created between the outer surface of the toroidal support and the inner surface of the tire;

wherein the admission of fluid under pressure takes place to an upper portion of the moulding cavity communicating with a lower portion of the cavity through said diffusion gap;

drawing fluid under pressure out of the lower portion of the moulding cavity, carried out concurrently with said admission step, so as to create a pressurized fluid stream in the diffusion gap; and, an axial movement of the inner circumferential edges of the tire from the equatorial plane of the toroidal support carried out concurrently with the tire expansion.

2. A method of moulding and curing tires for vehicle wheels, comprising the following steps:

disposing a tire on a toroidal support the outer surface of which substantially mates an inner surface of the tire;

closing the tire and the toroidal support inside a moulding cavity defined in a vulcanization mould, said moulding cavity having walls the shape of which match that of an outer surface of the tire when vulcanization has been completed;

enclosing inner circumferential edges of the tire within a bead seating formed by the coupling of inner circumferential portions of the toroidal support and the vulcanization mould;

pressing the outer surface of the tire against the moulding cavity walls;

transmitting heat to the tire to cause a molecular cross-linking;

wherein during said pressing step an expansion is imposed to the tire; and, separating the inner circumferential edges of the tire from the toroidal support by an axial movement of the inner circumferential edges of the tire away from the toroidal support, wherein said axial movement occurs concurrently with the tire expansion.

3. The method of claim 2, wherein the tire expansion is carried out by admitting a fluid under pressure to at least one gap for fluid diffusion created between the outer surface of the toroidal support and the inner surface of the tire.

4. The method of claim 2, wherein the axial movement of each inner circumferential edge of the tire from the toroidal support is carried out by axial movement of at least one radially inner portion of a cheek being part of said vulcanization mould and acting in a resting relationship on the respective inner circumferential edge of the tire.

5. The method of claim 4, wherein, concurrently with the tire expansion, side portions of said tire are moved to contact fixed portions of the cheeks.

6. The method of claim 5, wherein the movement of the tire side portions begins before the axial movement of the inner circumferential edges of the tire.

7. The method of claim 2, wherein the axial movement of the inner circumferential edges of the tire is carried out to an extent correlated with the expansion imposed to the tire.

8. The method of claim 3, wherein before said pressing step a tire preforming step is carried out by preliminary admission, between said outer surface of the toroidal support and the inner surface of the tire, of a working fluid to a pressure lower than that of the fluid admitted during said pressing step.

9. The method of claim 8, wherein the preliminary admission of fluid for execution of the preforming step takes place through feed channels formed in the toroidal support and opening onto the outer surface thereof.

10. The method of claim 8, wherein during the preliminary admission of working fluid the tire is sealingly engaged at its inner circumferential edges between the walls of the mould and the outer surface of the toroidal support.

11. The method of claim 3, wherein heat supply takes place by admission of a heating fluid to said diffusion gap, said heating fluid comprising the same fluid employed for carrying out the pressing step.

12. The method of claim 3, wherein before admission of fluid under pressure the inner tire surface adheres, substantially over the whole extension thereof, to the outer surface of the toroidal support, said diffusion gap being created following expansion of the tire.

13. The method of claim 3, wherein the admission of fluid under pressure takes place to an upper portion of the moulding cavity communicating with a lower portion of the cavity through said diffusion gap.

14. The method of claim 13, further comprising a step of drawing the fluid under pressure out of the lower portion of the moulding cavity, carried out concurrently with said admission step, so as to create a pressurized fluid stream in the diffusion gap.

15. The method of claim 3, wherein said diffusion gap has a size included between 3 mm and 14 mm measured between the inner surface of the tire and the outer surface of the toroidal support at least at one equatorial plane of the tire.

16. The method of claim 2, wherein said expansion involves an increase in the tire circumference included between 1.5% and 3.5%, measured at an equatorial plane of the tire.

17. The method of claim 2, wherein the step of disposing the tire on the toroidal support is accomplished by directly manufacturing the tire on the toroidal support.

18. The method of claim 2, wherein, before the pressurized fluid admission, a treatment of the inner surface of the tire is carried out for preventing permeation of the fluid under pressure through the elastomer material forming the tire.

19. The method of claim 2, wherein a pre-cured liner is directly formed on the toroidal support during a preliminary step of the tire manufacture, for preventing permeation of said fluid under pressure through the elastomer material forming the tire.

20. An apparatus for moulding and curing tires for vehicle wheels, comprising:

a toroidal support arranged to engage a tire being processed, said toroidal support having an outer surface substantially mating an inner surface of the tire;

a vulcanization mould comprising at least two cheeks axially movable between an open condition in which they are mutually spaced apart to enable said toroidal support carrying the tire to be introduced thereinto, and a closed condition in which they mate to enclose the toroidal support carrying said tire within a moulding cavity confined by inner walls of the mould the shape of which match an outer surface of the cured tire;

pressurizing devices for pressing the outer surface of the tire against the inner walls of the mould;

heating devices for transmitting heat to the tire enclosed between the moulding cavity and the toroidal support;

a bead seating formed by the coupling of the inner circumferential portions of the toroidal support and the vulcanization mould; and, wherein each of said cheeks comprises a radially outer annular portion and a radially inner annular portion acting at a respective inner circumferential edge of the tire and axially movable relative to said outer annular portion between a first position in which the radially inner annular portion abuts against an inner circumferential portion of the toroidal support to engage the inner circumferential edge of the tire within said bead seating, and a second position in which the radially inner annular portion is separated from the toroidal support.

21. The apparatus of claim 20, wherein said pressurizing devices are comprised of channels for feeding a fluid under pressure; and, wherein the channels are formed through the toroidal support and open onto the outer surface of the toroidal support.

22. The apparatus of claim 20, wherein the radially inner annular portions of said cheeks are movable relative to said outer annular portions between a first position in which they cooperate with inner circumferential portions of the toroidal support to hermetically engage the tire in a sealing manner at respective inner circumferential edges thereof, and a second position in which they are spaced apart from the toroidal support.

23. The apparatus of claim 20, wherein the outer surface of the toroidal support and the inner walls of the mould in said moulding cavity delimit a cavity for enclosing the tire which, when the mould is closed, has a greater volume than the tire.

24. The apparatus of claim 21, wherein said feed channels open into at least one diffusion gap for the fluid under pressure which is defined between the outer surface of the toroidal support and the inner surface of the tire.

25. The apparatus of claim 20, wherein the outer surface of the toroidal support has a lower extension than the extension of the inner surface of the cured tire.

26. The apparatus of claim 20, wherein said toroidal support has at least one centering shank; wherein the vulcanization mould has a centering seat; and, wherein the centering shank engages the centering seat to fix the position of the toroidal support relative to the vulcanization mould.

27. The apparatus of claim 26, wherein said centering shank extends along a geometric axis common to said toroidal support, said tire and said moulding cavity.

28. The apparatus of claim 21, wherein said heating devices comprise at least one duct for transmitting a heating fluid to the feed channels.

29. The apparatus of claim 20, wherein said heating devices and said pressurizing devices utilize a common fluid under pressure that transmits heat and pressure to the tire.

30. The apparatus of claim 20, wherein said toroidal support has an elastically deforms in an axial direction at least at regions corresponding to inner circumferential edges of the tire.

* * * * *